United States Patent
Muhlhoff

(10) Patent No.: US 6,883,568 B2
(45) Date of Patent: Apr. 26, 2005

(54) TIRE WITH ASYMMETRICAL AND REINFORCED SIDEWALLS

(75) Inventor: Oliver Muhlhoff, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/763,257

(22) Filed: Jan. 26, 2004

(65) Prior Publication Data

US 2004/0226642 A1 Nov. 18, 2004

Related U.S. Application Data

(63) Continuation of application No. PCT/EP02/07953, filed on Jul. 17, 2002.

(30) Foreign Application Priority Data

Jul. 25, 2001 (FR) .............................................. 01 09966

(51) Int. Cl.$^7$ ............................ B60C 3/06; B60C 13/00; B60C 15/00
(52) U.S. Cl. ...................... 152/197; 152/454; 152/456; 152/541; 152/546; 152/550; 152/551; 152/553; 152/555
(58) Field of Search .................................. 152/197, 200, 152/454–456, 516, 517, 541–543, 545, 546, 550, 551, 553, 555

(56) References Cited

U.S. PATENT DOCUMENTS

| 2,186,178 A | | 1/1940 | Shoemaker | |
| 3,656,532 A | | 4/1972 | Roberts | |
| 4,061,172 A | * | 12/1977 | Yoshida et al. | 152/543 X |
| 6,276,416 B1 | * | 8/2001 | Iwamura | 152/517 |
| 2003/0136488 A1 | * | 7/2003 | Muhlhoff | 152/455 |

FOREIGN PATENT DOCUMENTS

| EP | 0 770 504 A1 | | 5/1997 | |
| GB | 3276 | * | 2/1914 | 152/555 |
| WO | WO 02/09955 A1 | | 2/2002 | |

* cited by examiner

Primary Examiner—Adrienne C. Johnstone
(74) Attorney, Agent, or Firm—Burns, Doane, Swecker & Mathis, L.L.P.

(57) ABSTRACT

A tire comprising two beads, a crown and sidewalls that connect the crown to said beads, the tire being reinforced by a carcass reinforcement anchored in each bead to at least one annular anchoring element, each sidewall comprising an additional, inextensible sidewall ring located axially inside the axially outermost carcass ply and a coupling section located radially between the annular anchoring element in the bead and said sidewall ring and positioned axially inside the axially outermost carcass ply. The tire is characterized in that the line segments passing through the centers of gravity of the sections of the annular anchoring rings in the beads and through the center of gravity of the sidewall rings on the same respective side, make angles respectively of $\beta_1$ and $\beta_2$ relative to the rotation axis, these angles being different.

11 Claims, 2 Drawing Sheets

TIRE WITH ASYMMETRICAL AND REINFORCED SIDEWALLS

This application is a continuation of PCT/EP02/07953 filed on Jul. 17, 2002, the entire content of which is hereby incorporated by reference.

FIELD OF THE INVENTION

The invention concerns a tire with a semi-radial or radial carcass, which can be fitted in particular but not exclusively to vehicles that can roll at high speed.

BACKGROUND OF INVENTION

When a vehicle fitted with tires with a semi-radial or radial carcass drives round a bend, modifications of the rolling conditions occur and, in particular, the footprint (i.e. the contact surface between the tread of each tire and the road on which the vehicle is rolling) can be very considerably modified in the shape of its contour and in its area. Bearing in mind the contact forces between the tire and said road, this leads to rolling behavior that can produce threshold phenomena which are difficult for a driver to control, especially at high speed.

In the configuration adopted when rounding a bend (cornering), the tires of a vehicle on the outside of the bend undergo transverse forces of greater or lesser intensity; these forces stem from the contact between the ground and the tread, and from the large vertical stresses that include the initial load supported by the tire and the overloads (some of the vehicle's tires are relieved of part of their load, to the detriment of the others). The outside of the bend means the side of the vehicle furthest away from the instantaneous center of rotation of said vehicle around the bend. In addition, the tire/wheel assemblies fitted on the outside of the bend are displaced transversely towards the outside of the bend relative to their footprint on the ground, and the outer sidewall of the tires is markedly stretched by the contact forces exerted by the road on the tread, which is pulled towards the inside of the bend (overall, the part of the tire tread in contact with the ground does not slide and follows a curved path corresponding to said bend). Under these conditions the geometry of the footprint changes and becomes essentially trapezoidal, the shorter side being towards the inside of the bend. The result of this is that the contact pressures on the part of the tread near the outer sidewall increase compared with the axially opposite part of the same tread. This new distribution of contact pressures perturbs the behavior of the tire during cornering.

For tires fitted to passenger cars it is felt necessary to provide technical solutions which enable the greatest possible reduction of the geometrical variation of the contact footprint of tires when cornering, and which limit as much as possible the variation of the contact pressure distribution under the same conditions.

The patent application published under number WO 02/09955 by the present applicants describes a new tire structure that can roll at high speed and can be subjected to more or less harsh drive or braking couples. To increase the resistance of the tire carcass reinforcement to these couples a solution is proposed in which the transverse and longitudinal rigidities of the sidewalls are increased, on the basis of a principle involving an additional reinforcement ring in at least one sidewall combined with the presence of a section of rubber mixture located between this additional ring an and anchoring element of the carcass reinforcement in each tire bead.

To improve both the tire's grip performance when cornering and to transmit the couples while ensuring better stability performance when cornering whatever the rolling speed situation, the tire according to the invention comprises two beads, a crown provided with a tread, and sidewalls connecting the crown to said beads. Each tire bead has an inclined portion located radially on the inside and designed to be in contact with a seat of a mounting rim, the seat being such that the points of said seat axially furthest on the outside are located on a circle of larger diameter than the points of said seat furthest on the inside. The mounting rim comprises flanges axially outside the seats to restrict the axial displacement of the beads during mounting on the rim.

SUMMARY OF THE INVENTION

The tire according to the invention is reinforced by a carcass reinforcement comprising a carcass ply formed of reinforcement elements parallel to one another within the ply and forming an angle between 60° and 90° relative to the circumferential direction, said reinforcement being anchored in each bead to at least one annular anchoring element. The carcass reinforcement is surmounted radially on the outside by a crown reinforcement, itself surmounted by a tread.

This tire has a first and a second sidewall, each of these having an additional, inextensible ring located axially inside the axially outermost carcass ply. The angle of the line segment passing through the center of gravity of the section of the ring in the first sidewall and through the anchoring ring of the bead located in the extension of said first sidewall makes with respect to the rotation axis an angle $\beta_1$ open towards the outside of the tire. The angle of the line segment passing through the center of gravity of the section of the ring in the second sidewall and through the anchoring ring in the extension of said second sidewall makes with respect to the rotation axis an angle $\beta_2$ open towards the outside of the tire.

In addition, each sidewall comprises a coupling section located radially between the additional ring and the annular anchoring element in the bead, to produce a mechanical coupling between said additional ring and the anchoring element.

This tire is characterized in that the angle $\beta_1$ is different from the angle $\beta_2$. Advantageously, the first sidewall of the tire is designed to be positioned on the outside of a vehicle to which the tire is fitted, and the angle $\beta_1$ measured in the first sidewall is smaller than the angle $\beta_2$ measured in the second sidewall.

Preferably, the angle $\beta_1$ in the outside sidewall is at most equal to 70° and the angle $\beta_2$ in the inside sidewall is larger than 70°.

Preferably, the angle $\beta_2$ measured in the inside sidewall is open towards the outside of the tire and is between 75° and 100°.

Annular anchoring element in the bead means any element which enables the tensile forces in the carcass reinforcement produced by the inflation pressure to be absorbed. As is known in its own right, said annular element in the bead can be a bead wire, generally formed of circumferential wires or cables, or more generally a stack of several strips of wires or cables which make an angle of zero or at most 10° relative to the circumferential direction. As is also known, anchoring takes place by the adhesion, over a sufficiently large area, of the carcass reinforcement to the annular element, the adhesion surface being able to have a torus shape (as when the carcass reinforcement is wrapped around a bead wire clad with rubber mixture), or it may be a cylindrical or frustoconical surface or even have the shape of a circular crown (as when the carcass reinforcement is stuck to or inserted between a strip or strips of circumferential or virtually circumferential wires or cables). In addition, and since the tire is mounted on inclined seats, each annular bead element is subjected to compression forces on said seats.

The additional sidewall ring can take several forms: it can be a monofilament with cross-sectional dimensions or greater or less size; it can be in the form of a group of cables, whether this be a bead wire or a cable as such; or it can be in the form of a stack of strips of circumferential cords or cables, and the stack may be parallel to an equatorial or to a radial plane.

In an equivalent way, the additional ring can be made from a single material having appropriate rigidity in any case greater than the average rigidity of rubber mixtures; this additional ring can in particular be made of a plastic material, polyurethane, aromatic polyamide, resin reinforced with various fibres (carbon, glass, etc.), or of metal. The additional ring can also consist of two or more materials.

The additional ring can be hollow to limit the weight increase resulting from its presence in each sidewall.

In an also equivalent way, the additional sidewall ring and the coupling profile can be integrated in the same, single element which, for example, is produced independently of the fabrication of the tire itself and is then incorporated in the tire during the fabrication of the latter.

This single element can be made of a single material or of a composite material (i.e. a material comprising a matrix reinforced with reinforcements in order to confer the appropriate rigidities upon said element). When the single element is used in place of an additional ring and a section of rubber mixture, its cross-section is made appropriate for obtaining the desired rigidity and hence the mechanical effect required in the tire. Of course, to obtain a good bond between the single element and the rubber mixtures of the tire, the surface of said element can be treated so as to improve adhesion; orifices can also be made through said element to allow the passage of the tire's rubber mixtures during molding and vulcanization.

An essential factor in the functioning of each type sidewall according to the invention is the mechanical coupling formed between the additional sidewall ring and the bead, via the coupling section which extends said ring radially inwards.

As regards the coupling section axially on the inside of the axially external carcass ply, this can for example be made from an elastomer material and can have the property of withstanding at least the molding and vulcanization temperature of the tire. Preferably, in the molded tire the section has a Shore A hardness of at least 65, so as to offer good resistance to compression forces such that it produces the mechanical coupling effect described earlier as effectively as possible.

It was found that when the crown of a tire according to the invention is displaced transversely, the variations of the inclination of the line segments passing through the centers of gravity of the cross-sections of the additional sidewall rings and through the bead anchoring elements were substantially different, depending on the sidewall considered. The observed variation of the side of the first sidewall (initial angle $\beta_1$ smaller than 70°) is much less than the observed variation of the side of the second sidewall (initial angle $\beta_2$ larger than 70°.

Thus, when the first sidewall is positioned on the outside of a vehicle and the vehicle is cornering, the angular variation is substantially greater on the inside of the bend, i.e. on the side of the second tire sidewall initially inclined at the angle $\beta_2$. The consequence of this inclination difference is that the axial distance D between the centers of gravity (or barycentres) of the cross-sections of the sidewall rings remains essentially constant or even increases during cornering, and this from the beginning of the cornering.

Accordingly, for tires located on the outside of the bend, it is possible when cornering to avoid too large a decrease of the width of the contact footprint compared with the footprint when rolling in a straight line, and to reduce the contact pressure ratios between the inside of the footprint (corresponding to the part of the contact footprint on the inside of the bend) and the outside of the footprint, such that the behavior of a vehicle fitted with tires according to the invention is improved compared with those of the known prior art. Depending on the degree of asymmetry of the inclination of the line segments passing through the additional sidewall rings and the anchoring elements in the bead, the modification of the footprint shape and the contact pressure distribution can be adjusted to give the best effect.

The additional ring in each sidewall is preferably located at respective distances $H_1$ and $H_2$ from the bottom of each bead, which are smaller than two-thirds of the height H of the tire on its rim (measured between the bottom of the bead having smallest diameter and the point of the tread on the equatorial plane of the inflated tire), to allow the modification and adaptation of the meridian profile of the carcass reinforcement in particular in the shoulder zone of the tire. The distances $H_1$ and $H_2$ are measured between the bottom of each bead and the centers of gravity of the additional rings.

Preferably, the height $H_1$ of the first sidewall on the outside of the vehicle is larger than the height $H_2$ of the second sidewall. In addition, and to modify the rigidity of the first sidewall substantially, it is best for the height $H_1$ of the first sidewall to be larger than one-third of the height H.

To increase the efficacy with which the forces and driving or braking couples are transmitted, the carcass reinforcement preferably comprises at least two plies of reinforcement elements parallel to one another in each ply and making an angle between 60° and 90° relative to the circumferential direction, at least one of the plies being anchored in each bead by wrapping around the anchoring element, and with the second ply, known as the axially interior ply, located axially on the inside of the additional sidewall ring and the rubber section between the additional ring and the anchoring element in the bead.

Advantageously, said carcass reinforcement has three carcass plies: the axially external ply, which is preferably discontinuous and composed of two half-plies of textile, radial reinforcement elements parallel to one another in each half-ply and making an angle that can be between 60° and 90° relative to the circumferential direction, each half-ply having on the one hand a radially upper end under the edge of the crown reinforcement and on the other hand a radially lower edge which ends at the level of the anchoring element in the bead, and being arranged axially outside the section between the anchoring element and the sidewall ring, outside the sidewall ring and on the outside in the upper zone of the sidewall, two main carcass plies, axially on the inside, formed of textile reinforcement elements crossed from one ply to the next and forming angles between 60° and 90° with the circumferential direction, these being wrapped in each bead around the anchoring element to form turn-ups axially outside the edge of the axially external carcass ply.

Preferably, the carcass reinforcement plies are formed of textile reinforcement elements such as an aliphatic or aromatic polyamide, a polyester or rayon, which are parallel to one another within each ply.

The structure of each bead can be completed by at least one additional reinforcement which extends up the sidewall to a greater or lesser extent. This additional reinforcement, which consists of at least one ply of textile and/or metallic elements that make an angle between 0° and 45° relative to the circumferential direction, can be arranged axially outside or inside the main carcass reinforcement plies, and inside or outside the axially external ply.

The thickness of the section of elastomeric material positioned between the main carcass reinforcement and the additional ply, measured in each sidewall perpendicularly to the line joining the centers of gravity of the anchoring element and the additional ring, can be a minimum essentially at the level of said element and ring, and a maximum approximately towards the upper two-thirds of the height of the section, preserving a quasi-long-lined shape, with said maximum thickness at least equal to 3% of the height H of the tire on its rim.

While preserving the properties of the tire according to the invention, the weight can be reduced by decreasing the thickness of the section in its area close to the anchoring element of the carcass reinforcement.

BRIEF DESCRIPTION OF THE DRAWINGS

Other characteristics and advantages of the invention emerge from the description given below with reference to the attached drawings, which illustrate a non-limiting example of an embodiment of the object of the invention.

DESCRIPTION OF THE PREFERRED EMBODIMENTS

Figure 1:
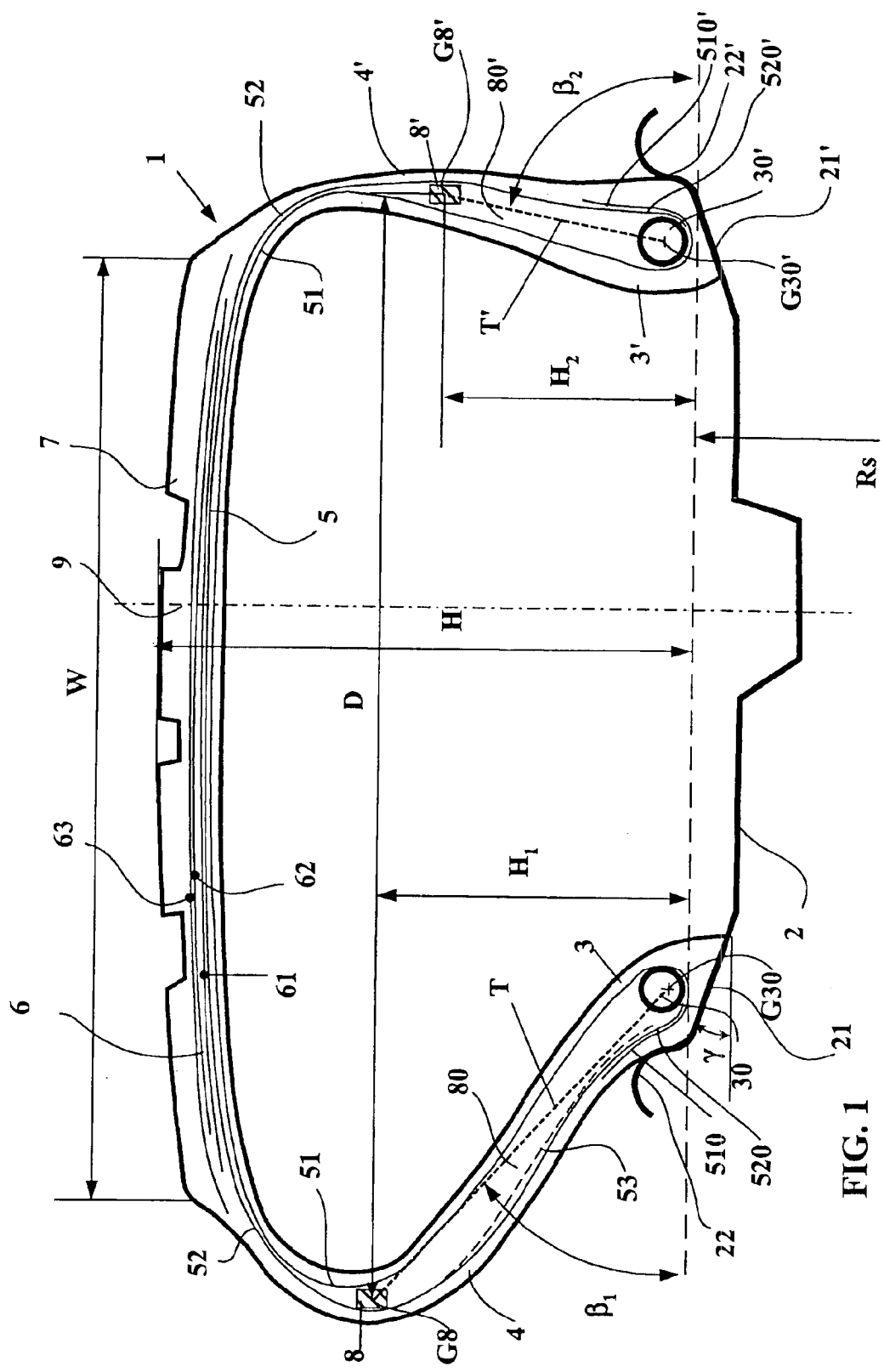
FIG. 1 shows a cross-section of a tire according to the invention, mounted on its mounting rim and inflated to its utilization pressure.

FIG. 1 shows a tire 1 according to the invention, mounted and inflated on its utilization rim 2 and intended for fitting to a passenger car. Viewed in meridian section, the tire comprises a crown 9 connected to the beads 3 and 3' of said tire 1 by two sidewalls 4 and 4', a first sidewall 4 called the outside sidewall and a second sidewall 4' called the inside sidewall. The beads 3 and 3' of the tire 1 comprise, radially on the inside, portions inclined at an angle which is open axially and radially outwards; these inclined portions are designed to be in contact with seats 21, 21' of the rim 2 which are also inclined by an angle γ, the same in both cases, which is open axially and radially outwards. When the tire has been mounted on its service rim, a mechanical compression effect is obtained between the rim seats and the tire beads mainly because of the pressurization of said tire. In addition, and as is known, the rim seats comprise a flange 22, 22' to restrict the axial displacement between the tire beads during mounting and inflation.

In the present case the rim seats have the same radius R, but the same type of tire solution could of course be developed with a rim having seats of different radius (with the tire then having beads sized accordingly).

The tire 1 is reinforced by a carcass reinforcement 5 consisting of a first ply 51, axially on the inside, continuous from one bead to the other and anchored in each bead to a bead wire 30, 30' of the braided type, to form turn-ups 510 and 510'. This first ply 51 is formed of a rubber matrix reinforced by aliphatic polyamide cables arranged along a direction making an angle close to 90° relative to the circumferential direction, said angle being measured in the equatorial plane of the tire. A second carcass ply 52 axially on the outside completes the reinforcement 5 and is formed of the same elements as those constituting the main ply 51; the ply 52 has two lower ends 520, 520' positioned in contact against the turn-ups 510, 510' of the ply 51 and located radially below a line parallel to the rotation axis and radially tangential to the outside of the contour of the bead wires 30 and 30'.

Radially outside the carcass reinforcement 5 is arranged a crown reinforcement 6, itself surmounted by a tread 7. This crown reinforcement 6 has two plies 61 and 62, called the working plies, each working ply comprising a plurality of metallic cables which make an angle between 15° and 25° relative to the circumferential direction, the cables of one ply 61 being crossed over relative to the cables of the other ply 62. The working plies 611 and 62 have unequal axial widths essentially close to the width W of the tread 7, and are surmounted radially by a ply 63 of width larger than the widths of the plies 61, 62 obtained by wrapping with a cable made of aromatic polyamide, which confers upon said cable a direction which is approximately circumferential on the tire.

The outer sidewall 4, intended to be positioned towards the outside of the vehicle on which the tire 1 is fitted, comprises an additional, inextensible reinforcement ring 8 positioned in the sidewall in such manner that the center of gravity G8 of its meridian section is located radially a distance $H_1$ from the bottom of the bead equal to 59% of the height H of the tire (measured on the tire mounted on its rim and inflated to the recommended pressure, relative to the bottom of the bead which is also the base of the rim).

Similarly, the inner sidewall 4', intended to be positioned towards the inside of the vehicle, comprises an additional, inextensible reinforcement ring 8' positioned in the sidewall so that the center of gravity G8' of its meridian section is located radially a distance $H_2$ from the bottom of the bead equal to 48% of the height H of the tire. These rings 8 and 8' are located in each sidewall between the carcass plies 51 and 52.

Inextensible ring means a ring which, under a circumferential tensile force equal to 10% of its breaking load, shows a relative elongation no greater than 1%. Besides, the bottom of a bead is conventionally the line parallel to the rotation axis of the tire and passing through the intersection point of the trace of the vertical wall axially on the outside of each bead, with the generatrix of the bead seat.

Each additional ring 8, 8' axially separates each sidewall reinforced by the carcass reinforcement 5 into an axially inner portion and an axially outer portion; the axially inner portion is the part of the sidewall reinforced by the carcass ply 51, while the axially outer portion is reinforced by the other carcass ply 52.

Similarly, each additional ring 8, 8' radially separates each sidewall into a radially upper and a radially lower portion; the radially upper portion, whose radial height is small, is the part radially outside the additional rings 8, 8' where the carcass plies 51, 52 are practically superposed, which corresponds to what is usually called the "pneumatic" part of the sidewall. The radially lower portion is the part radially inside the additional rings 8, 8' where the carcass plies 51, 52 are axially separated by a section of rubber mixture, respectively 80, 80', of considerable thickness and high Shore A hardness since the latter is equal to 80, and which corresponds to what is usually called the structural part. The Shore A hardness is measured in accordance with the standard ASTM D2240.

An additional reinforcement 53 completes the structure of the bead, extending the first sidewall 4. This additional reinforcement 53 is composed of a ply of textile elements which make an angle between 0° and 45° relative to the circumferential direction, said ply being arranged axially between the first and second plies 51, 52 of the carcass reinforcement and against the axially outer carcass ply 52.

The thickness of each section 80, 80', which is maximum essentially at its middle, is in the case described equal to 6% of the height H. Said second, radially lower part is markedly inclined with respect to the axial direction.

It can be seen that the inclination of the second, radially lower part is represented for the outer sidewall 4 by the direction of the line T joining the centers of gravity of the meridian sections respectively G30 of the anchoring bead wire 30 and G8 of the additional ring 8. This line T makes an angle $\beta_1$ relative to the axial direction, which is open axially and radially towards the outside of the tire and is at most equal to 70°, in the case described equal to 56°.

It can also be seen that the inclination of the second radially lower part is represented for the inner sidewall 4' by the direction of the line T' joining the centers of gravity of the meridian sections respectively, G30' of the anchoring bead wire 30' and G8' of the additional ring 8'. This line T' makes with the axial direction an angle $\beta_2$ open axially and radially towards the outside, between 75° and 100° and in the case described equal to 85°.

The rubber section 80 in the outer sidewall 4 inclined at angle $\beta_1$ axially between the two carcass plies 51 and 52, offers a high resistance to compression forces and so greatly reduces the amplitude of the possible axial displacement of the sidewall ring 8, in particular towards the inside (i.e. in the direction of the ring 8').

The essentially pneumatic structure of the upper part of each sidewall has the property of facilitating flat contact between the tread and the ground, and so increasing the width of the contact area between said tire and the ground, while allowing the tire to be made with standardized dimensions. The increased volume of tire-tread rubber brought into play brings many advantages, in particular an improvement of all performances related to the contact between the tire and the ground: grip, wear, heating, behavior, to mention only those performances which are the most greatly influenced.

Figure 2:
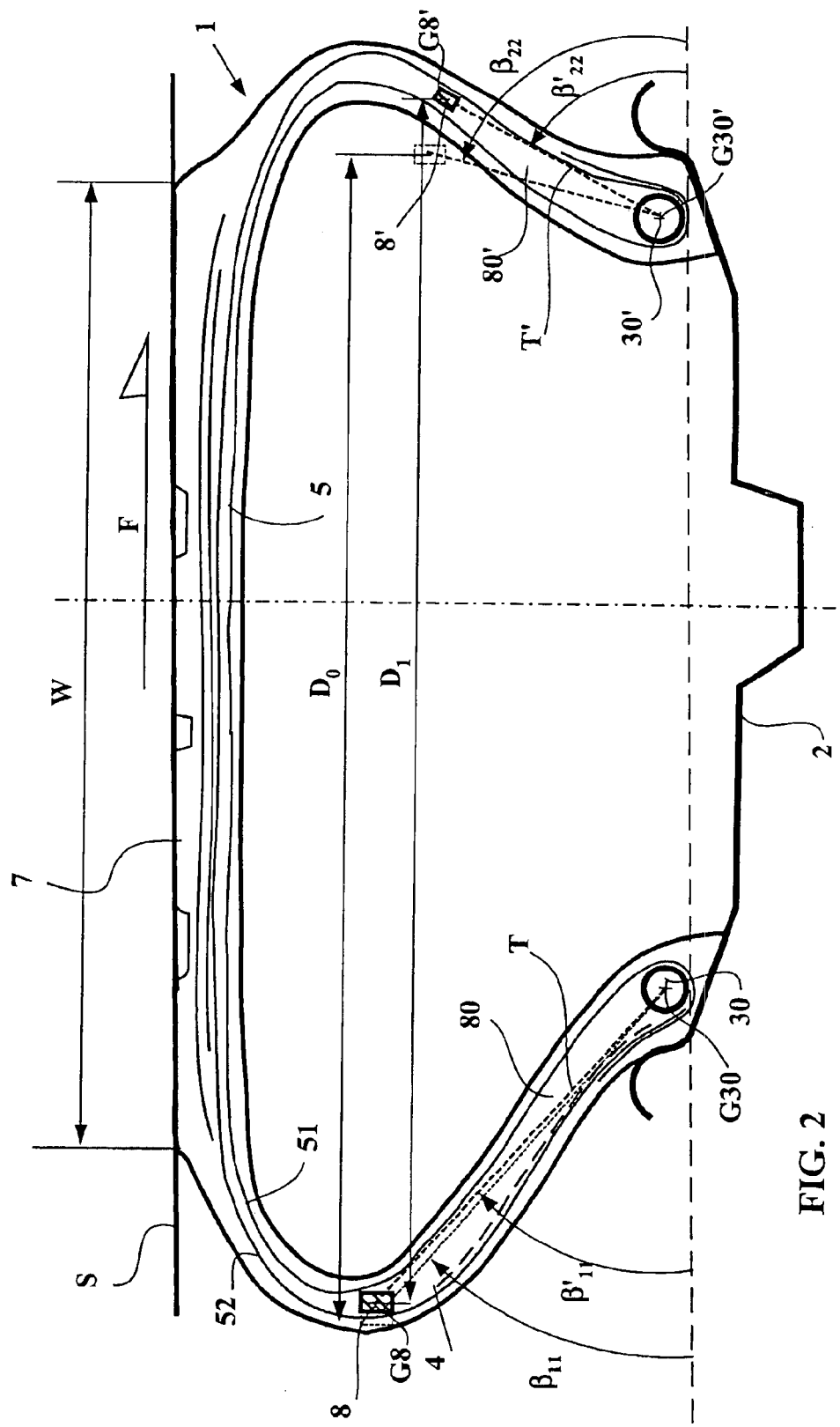
FIG. 2 shows a cross-section of the tire in FIG. 1, in the area of its contact with the road, said tire being subjected to transverse forces applied to its tread and simulating a cornering configuration.

In addition, the asymmetry of the inclinations and radial positions of the rubber sections 80 and 80' allow the axial distance (measured parallel to the rotation axis) separating the additional rings in each sidewall to be increased during cornering, as can be seen in FIG. 2 which shows the same tire viewed in meridian section, in its area in contact with the road.

In FIG. 2 the tire 1 is shown inflated and deformed in a cornering configuration on the ground S, and the arrow marked F in the drawing indicates the direction of the transverse forces exerted by the ground on the contact surface of the tread 7. The position represented corresponds to the front, left-hand tire of a vehicle turning to the right.

In the first sidewall 4 on the outside of the bend, it can be seen that the line T joining the centers of gravity of the meridian sections respectively G30 of the anchoring bead wire 30 and G8 of the additional ring 8 has moved from an inclination $\beta_{11}$ (measured during rolling in a straight line) to an inclination $\beta_{11}'$ (measured while cornering) which is slightly greater than $\beta_{11}$. At the same time, the line T' joining the centers of gravity of the meridian sections respectively G30' of the anchoring bead wire 30' and G8' of the additional ring 8' in the second sidewall 4' has moved from an inclination $\beta_{22}$ (measured during rolling in a straight line) to an inclination $\beta_{22}'$ (measured while cornering) smaller than $\beta_{22}$. Surprisingly, it can be seen that the variation of the inclination of the line T' from the deformed position in a straight line and the position when cornering is substantially greater than the variation of the inclination of the line T under the same conditions.

This results in an appreciable increase of the distance separating the additional rings 8 and 8' between the position when rolling in a straight line (marked as $D_0$) and the same distance measured while cornering (and marked as $D_1$). This increase of the axial distance between the rings enables the width W of the contact footprint to be preserved or even increased when cornering, and in particular enables the avoidance of imbalance in the distribution of contact pressures between tire and ground during the phases of cornering.

In the example described with reference to FIGS. 1 and 2, the diameters of the beads are essentially identical and allow the tire to be mounted on a rim whose bead seats have identical diameters; however, it may be advantageous to combine the characteristics of the invention with the fact that the tire bead which extends the first sidewall intended to be positioned on the outside of the vehicle could have a diameter smaller than the diameter of the other bead. Similarly, at least one rim seat can have a generatrix whose axially innermost points are on a circle of diameter larger than the diameter of the circle on which are located the axially outermost points of the same generatrix.

The scope of the invention is not exceeded if other additional reinforcements are added in the sidewalls of the tire considered, for example a ply of reinforcement elements wrapped around at least one additional sidewall ring to form two strips radially above said ring, strips which are axially adjacent and which can advantageously replace at least one of the rubber sections 80, 80'.

What is claimed is:

1. A tire comprising two beads, a crown provided with a tread and first and second sidewalls connecting said crown to said beads, said beads comprising radially on the inside portions which make an angle open axially and radially outwards and intended to be in contact with a rim comprising rim seats inclined at an angle $\gamma$ which is also open axially and radially outwards, said tire being reinforced by a carcass reinforcement comprising at least one carcass ply formed of reinforcements parallel to one another in the ply and making an angle $\alpha$ relative to the circumferential direction such that $60° \leq \alpha \leq 90°$, said reinforcement being anchored in each bead to at least one annular anchoring element, and the carcass reinforcement being surmounted radially by a crown reinforcement itself surmounted by the tread, the first and second sidewalls each having an additional, inextensible ring located axially inside the axially outermost carcass ply, the line segment passing through the center of gravity G8 of the section of the ring in the first sidewall and through the anchoring ring in the bead located in the extension of said first sidewall making an angle $\beta_1$ with the rotation axis which is open towards the outside, the line segment passing through the center of gravity G8' of the section of the ring in the second sidewall and through the anchoring ring in the bead located in the extension of said second sidewall making an angle $\beta_2$ with the rotation axis which is open towards the outside, each sidewall comprising a coupling section located radially between the additional ring and the annular anchoring element in the bead, said tire, when mounted on its service rim and inflated to the recommended pressure, wherein, as viewed in meridian section, the angle $\beta_1$ is different from the angle $\beta_2$.

2. The tire according to claim 1, wherein the first sidewall is intended to be positioned on the outside of a vehicle to which said tire is fitted.

3. The tire according to claim 1, wherein the angle $\beta_1$ measured in the first sidewall is smaller than the angle $\beta_2$ measured in the second sidewall.

4. The tire according to claim 3, wherein the first sidewall is intended to be positioned on the outside of a vehicle to which said tire is fitted.

5. The tire according to claim 3, wherein the angle $\beta_1$ measured in the first sidewall is equal to at most 70° and the angle $\beta_2$ measured in the second sidewall is larger than 70°.

6. The tire according to claim 5, wherein the angle $\beta_2$ measured in the second sidewall is between 75° and 100°.

7. The tire according to claim 1, wherein the additional ring of the first sidewall is located radially a distance $H_1$ from the bottom of the bead and the additional ring of the second sidewall is located radially a distance $H_2$ from the bottom of the bead, these distances $H_1$ and $H_2$ being smaller than two-thirds of the height H of the tire on its mounting rim, said height H being measured between the bottom of the bead and the point on the crown in the equatorial plane of the tire.

8. The tire according to claim 7, wherein the height $H_1$ is larger than the height $H_2$.

9. The tire according to claim 8, wherein the height $H_1$ is larger than one-third of the height H of the tire on its rim.

10. The tire according to claim 1, wherein in each sidewall, the coupling section axially inside the axially outermost carcass ply is made of an elastomeric material having Shore A hardness equal to at least 65.

11. The tire according to claim 1, wherein the carcass reinforcement is formed of at least two plies of reinforcement elements parallel to one another in each ply and making an angle $\alpha$ with the circumferential direction such that $60° \leq \alpha \leq 90°$, at least one of the plies being anchored in each bead by wrapping around the anchoring element in the bead, and the second ply, called the axially inner ply, being located axially inside the additional sidewall ring and the coupling section between the additional ring and the anchoring element in the bead.

* * * * *